H. LUCKENBACH.
STRUCTURE FOR HEATING OR SUPERHEATING PURPOSES.
APPLICATION FILED OCT. 26, 1911.
1,025,949.  Patented May 7, 1912.
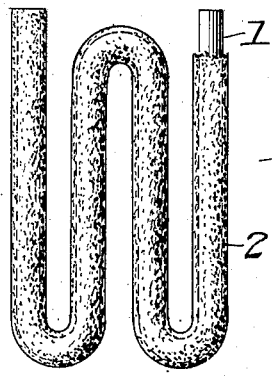
Fig. 1.
Fig. 2.
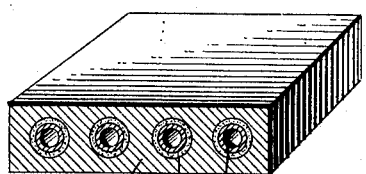
Fig. 3.
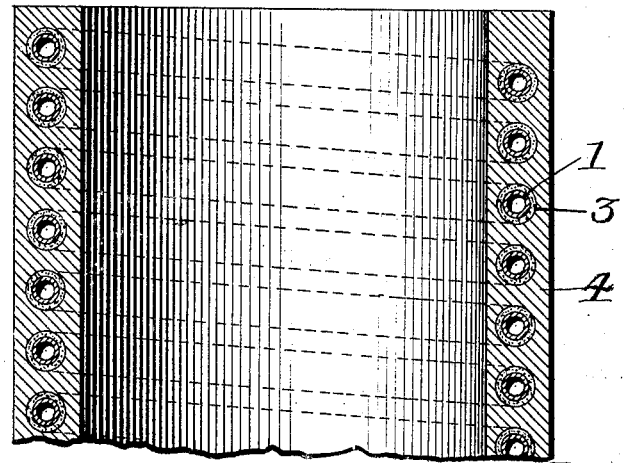
Witnesses.  Inventor.

UNITED STATES PATENT OFFICE.

HARRY LUCKENBACH, OF CHICAGO, ILLINOIS, ASSIGNOR, BY MESNE ASSIGNMENTS, TO LUCKENBACH INVENTIONS DEVELOPMENT COMPANY, OF NEW YORK, N. Y., A CORPORATION OF NEW YORK.

STRUCTURE FOR HEATING OR SUPERHEATING PURPOSES.

1,025,949. Specification of Letters Patent. Patented May 7, 1912.

Original application filed April 26, 1911, Serial No. 623,471. Divided and this application filed October 26, 1911. Serial No. 656,904.

*To all whom it may concern:*

Be it known that I, HARRY LUCKENBACH, a citizen of the United States, residing at Chicago, in the county of Cook and State of Illinois, have invented certain new and useful Improvements in Structures for Heating or Superheating Purposes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to devices intended primarily for heating water and for superheating steam, air or other gases, and more particularly to such heaters in which the channel or chamber for the fluid or agent to be heated is incased or inclosed within a body of metal which serves as a protecting incasement for the chamber or channel to which the fluid is supplied and also serves to absorb and transmit heat to the chamber or channel in which the water is to be heated or its heat retained or maintained, or the steam, air or other gases superheated.

The object of the invention is to form such a heater in which the chamber or channel for the fluid or steam, air or other gases may be capable of contraction or expansion and be protected from the disintegrating influence of the intense heat made use of for heating the water or superheating the steam, air or other gases, and at the same time provide for the fullest utilization of the heat and its transmission to the fluid contained in the chamber or channel.

To the accomplishment of the foregoing and such other objects as may be hereinafter made to appear the invention contemplates the application to the surface of the chamber or channel of a non-fusible plastic composition having the characteristic of retaining its homogeneity without fracture or the formation of fissures during the step of being baked to hardness preparatory to being incased in a body of molten cast metal, and possessing the further characteristic of becoming comminuted or pulverized upon the application of the body of molten cast metal thereto. It is necessary that the plastic composition should not fracture or fissure before the application of the body of molten cast metal to it because if it did, the molten cast metal would come in contact with the wall of the chamber or channel, the same being ordinarily of cast, wrought or steel metal, and disintegrate or destroy the integrity of the material composing the wall of the chamber or channel, and it is also desirable to have the plastic material comminute or pulverize upon the application thereto of the body of molten cast metal so that as the cast, wrought iron, or steel chamber or channel thus becomes incased within a body of cast metal the pulverized non-fusible substance between the wall of the chamber or channel and the body of cast metal will serve to protect the chamber or channel from the destructive influence of the intense heat derived by the cast metal from the heat products of a combustion chamber and transmitted through such body to the chamber or channel containing the fluid or agent to be heated, said pulverized non-fusible substance also permitting expansion and contraction of the metal constituting the chamber or channel which would not be provided for if the non-fusible substance between the body of cast metal and the wall of the chamber or channel were solid.

The structure produced comprises a chamber or channel to contain the agent to be heated or superheated and the incasing body of cast metal with the non-fusible fire-resisting pulverized substance intervening between the cast metal body and the chamber or channel for the agent or fluid to be acted upon, and is susceptible of a diversity of applications or uses where a structure having the characteristics mentioned is desirable or necessary for accomplishment of the objects in view, and while therefore I may illustrate and describe different applications for some particular specified uses it is to be understood that such special uses are merely illustrative of some of the uses in which the invention serves a highly useful purpose or function. Accordingly in the accompanying drawing to which reference is made as a part hereof: Figure 1 represents a coil of pipe incased in a non-fusible fire-resisting coating preparatory to applying thereto a body of molten cast metal; Fig. 2 is a perspective view of a cast iron block having the chamber or pipe incased therein and with the intervening comminuted or pulverized non-fusible filling or substance; and Fig. 3 a section of a cast iron block with inclosed pipe or chamber and intermediate pulverized substance, and curved to represent a section of a fire-box or combustion chamber.

For the purpose of obtaining a proper plastic composition possessing the necessary conditions or characteristics for successfully carrying into effect the invention I have made numerous experiments with a number of different refractory or fire-resisting clays and discovered that many of the materials experimented with failed to give the results because the substance or composition although non-fusible would, upon being baked or hardened, crack or have fissures formed therein so that when molten cast metal was applied to the coating the molten metal would find its way through the fissures or cracks and coming in contact with the cast or wrought iron or steel chamber or channel would disintegrate or destroy the texture or fiber of the metal so that the chamber or channel would be rendered unfit for the purposes contemplated. Finally I discovered that the non-fusible clay known as "blast furnace clay" is sufficiently moisture receptive as to amalgamate advantageously with graphite and a non-inflammable oil so as to form a plastic composition which will adhere tenaciously to the surface of the cast, wrought or steel metal chamber or channel to which applied and enable the same to be baked or hardened without contracting to a degree that would cause fissures or fractures in the plastic coating, thus making it possible to apply molten cast metal to the chamber or channel and this coating without coming in contact with and injuring the metal constituting the chamber or channel. I obtained the best results by combining with the "blast furnace clay", pulverized graphite in the proportion substantially of one part of pulverized graphite to two parts of the "blast furnace clay" and adding sufficient oil to moisten the mixture and produce a plastic composition which would adhere tenaciously to the iron surface coated with it. I also discovered that by using cottonseed oil as the moistening agent the best results were obtained because this oil would not inflame or burn but merely evaporate or partially so under the heat to which the plastic composition, and chamber or channel inclosed by it, was subjected in the baking or hardening of the composition, and this resulted in obtaining a hard and solid mass free from fractures inclosing the metal chamber or channel. In using this plastic composition I usually apply it to the metal surface 1 to produce a coating 2 varying from one-quarter of an inch to one inch in thickness, and after so coating the metal chamber or channel the whole is placed within a suitable oven for heating and baking the composition until it becomes hard or solid. After the plastic composition has thus been hardened the chamber or channel coated therewith is placed in a suitable mold and molten cast metal, preferably high-grade cast iron, is introduced or applied so as to wholly incase the cast, wrought iron or steel chamber or channel. This molten cast iron coming in contact with the plastic coating disintegrates or comminutes the composition, any trace of oil remaining passing off and leaving the composition in the condition of a pulverized substance 3 filling the space between the molten cast iron body 4 and the cast, wrought or steel metal chamber or channel. The plastic composition prevents the molten metal from coming in contact with the wrought iron during the casting operation, and when pulverized serves to practically fill the space between the body of cast iron and the incased chamber or channel and by reason of the pulverized character of the material provides for contraction and expansion of the cast, wrought iron or steel chamber or channel within its incasing body in the uses to which the structure may be applied. This non-fusible pulverized material thus interposed between the cast metal body and the cast, wrought iron or steel chamber or channel allows the intense heat to which the cast metal incasing body may be subjected to be transmitted from it and through the pulverized filling to the cast, wrought iron or steel chamber or channel and without the cast metal incasing body being in direct contact with the surface of the cast, wrought or steel metal chamber or channel. The cast iron incasing body can be subjected to a very high degree of heat without deterioration and which would disintegrate or destroy the cast, wrought or steel chamber or channel if alowed to come in direct contact therewith. It has been proposed heretofore to incase wrought iron pipes in a molten body of cast metal but when molten cast metal is brought in direct contact with a wrought iron pipe the molten metal tends to melt the pipe with which it comes in contact.

The "blast furnace clay" forming a part of my composition is a red clay containing a relatively large percentage of magnesia and is commonly used in connection with blast furnaces.

The structure produced under the method described is particularly well adapted for use in superheating steam, air or other gases as the cast metal incasing body will without detriment to its texture receive, absorb and give forth during a relatively long period a very high degree of heat and can be brought to a state of incandescence so as to transmit to the inclosed cast, wrought iron or steel chamber or channel such a high temperature as to obtain the highest superheating of the steam, air or other gases passing through the cast, wrought iron or steel chamber or channel. It can however also be employed to advantage where water is to be heated by passing it through the cast, wrought iron or steel chamber or channel.

I do not claim herein the method of making the heating structure as the same forms the subject of a separate application filed April 26, 1911, being Serial Number 623,471 and of which this is filed as a divisional application.

Having described my invention and set forth its merits what I claim is:—

1. A heating structure comprising a metal chamber or channel, a cast iron body cast about and spaced from said chamber or channel for absorbing and transmitting heat to the channel or chamber, and a pulverized refractory substance in the space between the chamber or channel a cast-metal body for the transmission of heat received from the incasing body of cast metal and permitting expansion and contraction of the metal chamber or channel.

2. A heating structure comprising a metal chamber or channel, a metal body cast about and spaced from said chamber or channel, and a filling in the space between the chamber or channel and incasing cast metal body, said filling including a refractory material and graphite.

3. A heating structure comprising a metal chamber or channel, a cast-iron body incasing said chamber or channel and spaced therefrom, and a filling in the space between the chamber or channel and incasing cast-iron body, said filling including " blast furnace clay " and graphite.

In testimony whereof I affix my signature in presence of two witnesses.

HARRY LUCKENBACH.

Witnesses:
 HARRY SIMONS,
 R. L. SELENE.